Figure 1:
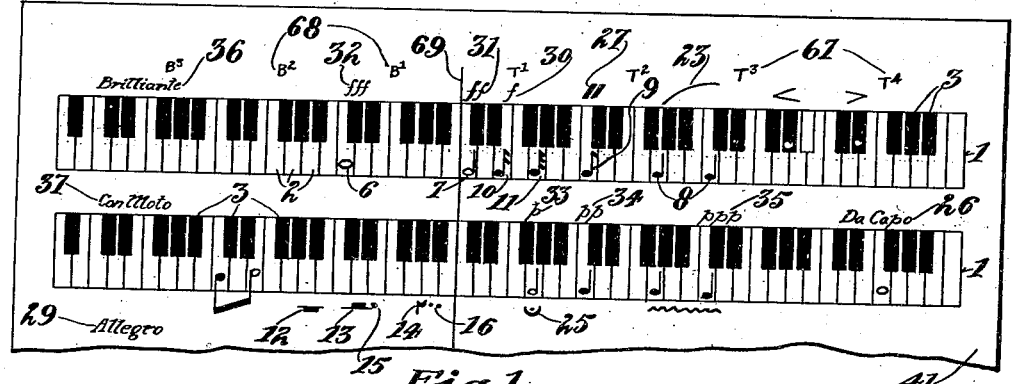

D. J. DICKSON.
MUSIC REPRESENTATION.
APPLICATION FILED NOV. 28, 1910.

1,053,366.

Patented Feb. 18, 1913.

3 SHEETS—SHEET 1.

Witnesses:

Inventor:

D. J. DICKSON.
MUSIC REPRESENTATION.
APPLICATION FILED NOV. 28, 1910.

1,053,366.

Patented Feb. 18, 1913.

3 SHEETS—SHEET 2.

Witnesses:

Inventor:

D. J. DICKSON.
MUSIC REPRESENTATION.
APPLICATION FILED NOV. 28, 1910.

1,053,366.

Patented Feb. 18, 1913.

3 SHEETS—SHEET 3.

UNITED STATES PATENT OFFICE.

DAVID J. DICKSON, OF CINCINNATI, OHIO.

MUSIC REPRESENTATION.

1,053,366. Specification of Letters Patent. Patented Feb. 18, 1913.

Application filed November 28, 1910. Serial No. 594,561.

*To all whom it may concern:*

Be it known that I, DAVID J. DICKSON, a citizen of the United States, residing at Cincinnati, in the county of Hamilton and State of Ohio, have invented certain new and useful Improvements in Music Representation, of which the following is a specification.

My invention relates to novel music representation for obviating the difficulties experienced by persons not familiar with the interpretation of music as shown in connection with ordinary staves, and to enable a performer to locate the notes upon the fingering board of a musical instrument by the representation of notes upon a representation of a corresponding fingering board.

My invention is applicable to music to be read for instruments of various kinds, as for instance the piano, organ, guitar, harp, banjo, mandolin, zither, or xylophone, and also for wind-instruments of various kinds, in fact, any instrument in which a fingering board is employed, and irrespective of whether the fingering board be provided with strings for string-instruments or with apertures or keys for wind-instruments, the fingering board of such instruments like the piano or organ being more commonly designated by the term key-board.

My invention is also applicable to the representation of vocal music by the depiction of the notes upon representations of the key-board, for instance, of the piano, from which the exact pitches or tone values may be perceived without the difficult interpretation necessary when shown in the form of music written upon the ordinary staves, and my invention provides ready means for reading music, for the cutting or printing of the perforated webs of rolls of music for the automatic piano, or the like.

In my invention the music is read directly from a representation of a fingering board, upon which the notes of various pitches and duration-values are placed in positions which correspond to the pitch-positions of the notes upon the fingering board of the instrument, so that the finger positions indicated by the notes in the representations of the fingering board are struck or acted upon the fingering board of the instrument, thereby rendering unnecessary the complicated mental process of reading music as now ordinarily written, from a system of notes which has nothing directly suggestive of the fingering board of the instrument being played.

In the ordinary staff-system of depicting music, it is necessary to indicate the key in which the music is written, by various key-signatures, usually indicated by sharps or flats in different numbers and positions by which the pitch values of the notes in the various keys of music are denoted, it being necessary for the performer to constantly remember which of the notes have their pitch-values thus affected or to be constantly referring back to the beginning of the staff to ascertain what key is required, whereas in my invention the performer places his fingers on the finger-positions or strikes the keys indicated on the representations of the fingering board or key-board, the respective notes being thus indicated without reference to the particular key of music.

In my invention the durations of the notes may be shown on the representations of the fingering board or key-board and be in the forms now in general use, and other indicia, such as rests, trills, broken chords, various intonations, expressions and musical variations and terms, may also be indicated at the proper places on the fingering board or key-board representations, and convenient means provided for distinguishing the treble and bass notes.

In my invention further, the reading of the notes at extreme points above or below the staff, which is very difficult in the ordinary staff-system, is dispensed with, the notes appearing on the representations of the fingering board or key-board in connection with the finger-positions or keys actually affected on the fingering board or key-board of the instrument.

My invention further provides a system which greatly simplifies the teaching of music to children, and also enables people, who have no knowledge of music, to readily and quickly learn to play musical instruments, and is also applicable for enabling anyone desiring to play an instrument to readily ascertain the finger-positions or keys to be manipulated or struck by the depictions of the notes in connection with the finger-positions or keys on the representations of the fingering board or key-board of the instrument, the performer placing his fingers upon the fingering board or key-board of the instrument, in the note-positions clearly shown upon the representations of said board.

My invention further provides means whereby the treble and bass notes, e. g., the notes to be played for instance in a key-instrument, such as the piano, respectively with the right hand and the left hand, are placed side by side and are distinguishingly represented to clearly indicate which notes are to be played simultaneously by the two hands.

I have illustrated my invention in connection with the representations of the key-board of the piano, from which its application to other instruments may be seen, the representation in connection with the key-board of a piano being for purposes of illustration and not to be construed as a limitation.

Figure 2:
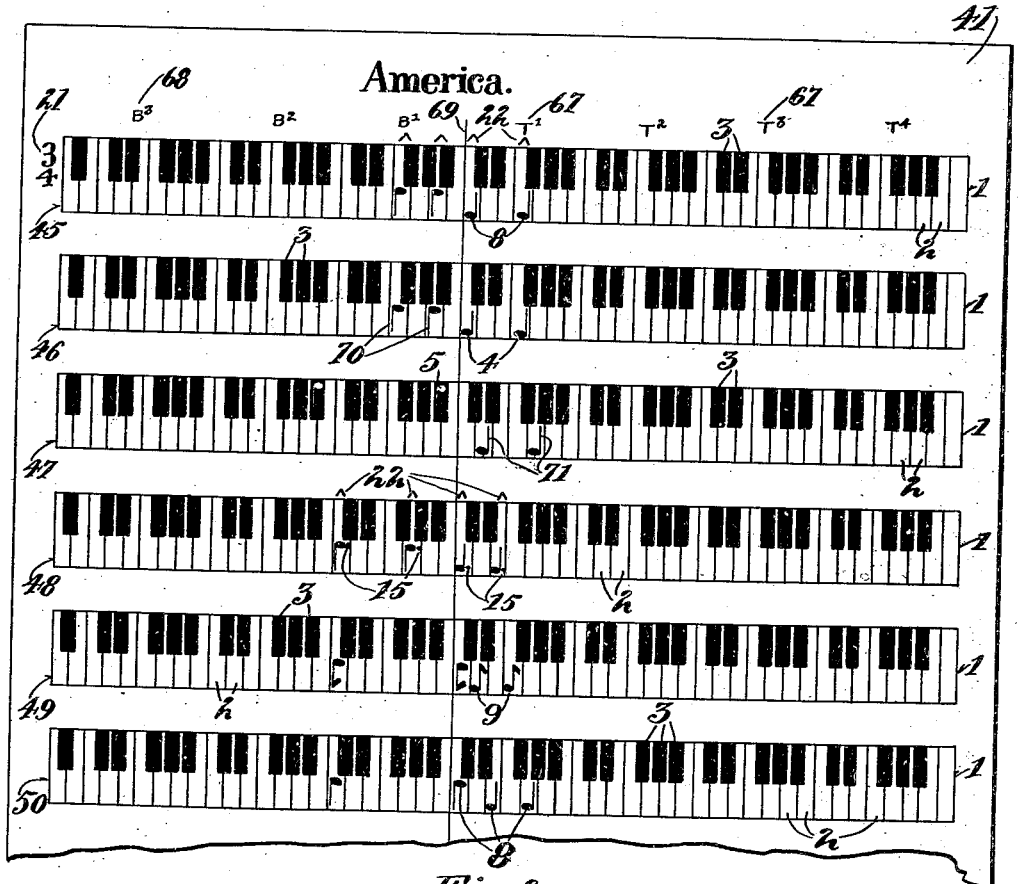
Figure 3:
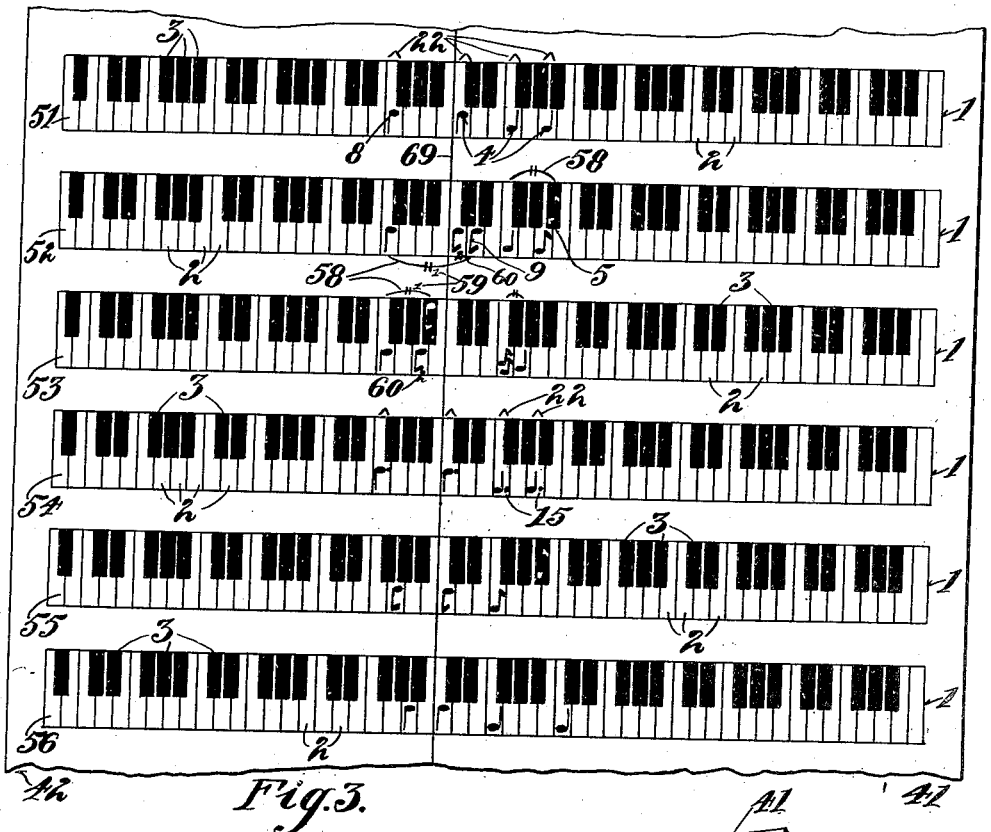
Figure 5:
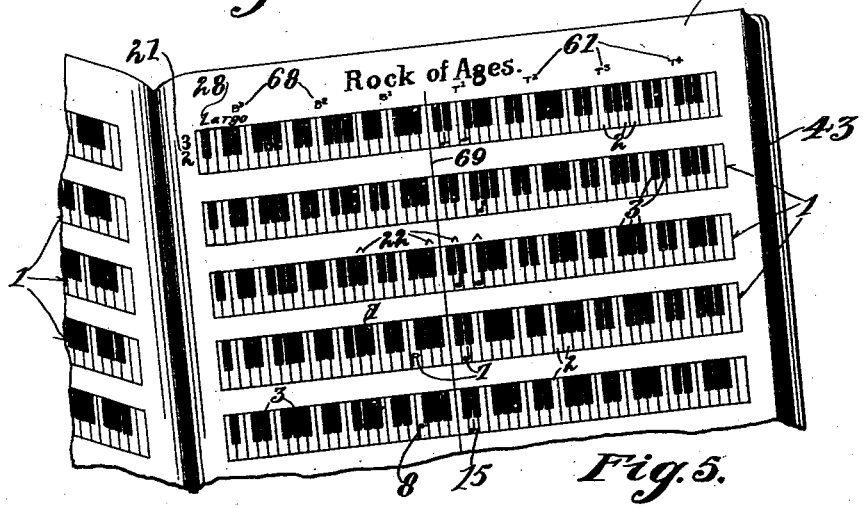
Figure 4:
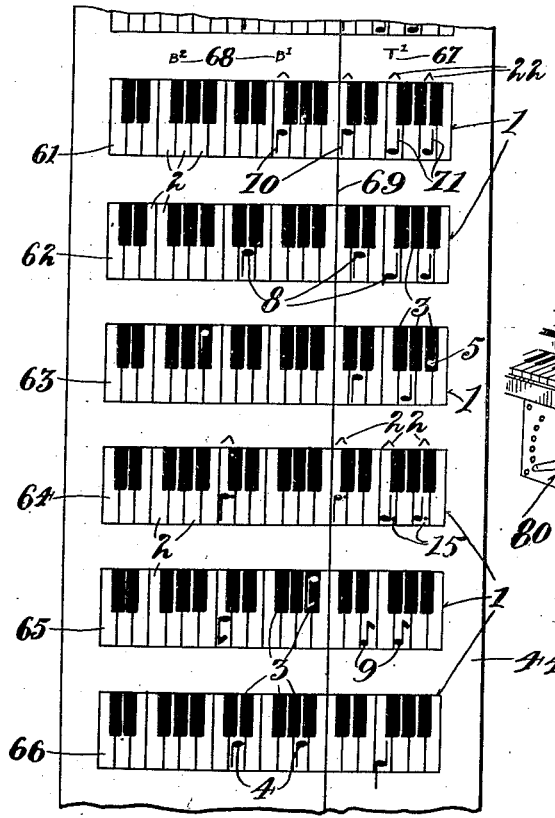
Figure 6:
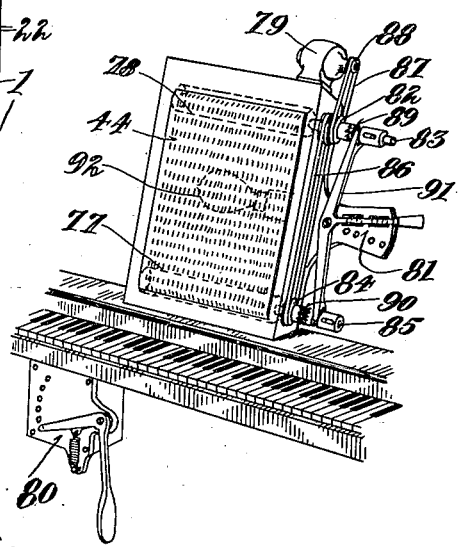

In the drawings: Figure 1 represents a sheet of music, according to my invention, upon which appear representations of the key-board of a piano, upon the representations of the keys or digitals of which various notes are shown, and in connection with which various music-indicia appear in relation to the notes affected thereby, the sheet being partly broken away. Figs. 2 and 3 represent sheets of music, according to my invention, upon which respectively the representations of the key-board of a piano are shown in successively superposed arrangement, Fig. 2 depicting the first two measures of the well-known selection "America", also known as "My Country, 'tis of of Thee", and Fig. 3 depicting the third and fourth measures from the last in said selection, the sheets being partly broken away. Fig. 4 represents a sheet of music according to my invention, upon which is depicted a portion of a musical selection, namely the third and fourth measures of "America", the representations of the key-board being abbreviated and the octaves distinguishingly represented for locating the register of the representations upon the key-board of the instrument, the sheet being partly broken away. Fig. 5 is a perspective view, representing the sheets having the music thereon arranged according to my invention, bound in the form of a book, partly broken away. Fig. 6 is a perspective view showing a web of flexible material upon which the music is arranged according to my invention, capable of being rolled or unrolled, and means for lighting the reverse side of said flexible material and for rotating the roll.

1, 1 are representations or depictions of the usual key-board of a piano, of which 2 represent the white keys or digitals, and 3 the black keys or digitals. Notes are shown in visual manner in connection with the representations of the keys, being preferably depicted on the key representations, the notes 4 for the white keys of the piano being shown on the white-key representations, and the notes 5 for the black keys of the piano being shown on the black-key representations.

For the purpose of distinguishing the notes in the drawings, the notes 4 are shown in black on the white-key representations, and the notes 5 are shown in white on the black-key representations, although in practice colors may be employed to clearly show the notes, for instance, by showing all the notes of one color or black, and showing the representations of the white keys, white, and the representations of the black keys in some light color, as for instance pink, upon which the notes will distinctly show in black, the idea being to clearly show the notes in connection with the representations of the keys.

The key-representations indicate the finger-positions of the fingers on the key-board of the piano, the key-board being the fingering board of this instrument. When notes appear in connection with any of the key-representations, they indicate that corresponding keys on the piano are to be struck for playing the notes thus represented, the durations or time-values of the played notes being preferably indicated by the character of the notes depicted as in ordinary staff notation. If it is desired to apply my invention to other instruments, successive representations of the fingering board of the instrument desired are depicted, and notes are shown in connection with the representations of the fingering board and in positions which correspond to the notes produced by the manipulations in the corresponding finger-positions on the instrument.

The duration-values of the notes depicted are preferably indicated in similar manner to the indications of duration-values now in general use. Thus 6 represents a whole note or semibreve, 7 a half-note or minim, 8 a quarter-note or crotchet, 9 an eighth-note or quaver, 10 a sixteenth note or semiquaver, and 11 a thirty-second note or demisemiquaver, and other duration-values may be correspondingly indicated. Rests, shown at 12, 13 and 14, may also be correspondingly represented. The duration-values of the notes and rests may also be shown by dots, as for instance the single dots 15 to indicate a prolongation of the note or rest for one-half its value, or the double dots, shown at 16 to indicate an additional prolongation of one-half of the initial prolonged value. Various musical indicias may also be employed in connection with the representations of the fingering board, but it will be noted that all indicia indicating key or pitch may be dispensed with, the presence of sharps, flats or naturals or the indications of the key in which the music is written being unnecessary, for the reason that the notes themselves, whether natural, sharp, or flat, which are to be played, are shown in connection with the key-representations at the finger-positions of those notes, so that it is necessary for the performer only to locate upon the fingering board of the instrument the depicted locations for his fingers shown in the picture of the fingering board or keyboard of the instrument, thus rendering unnecessary the difficult and confusing translation of staff representations of music. Other indicia, such as those for duration, as already explained, time and accent, conjunction or separation of tones, graces, and words and signs relating to pace, intensity, and style and for other purposes, may be employed. These are preferably placed adjacent to the notes used and may be arranged above or below the representations of the fingering board. Thus 21 represents a signature which may be placed at the beginning of the selection, or repeated from time to time as may be desired, and the first note of each measure may be indicated by an accent 22.

23 represents a slur, which is preferably written above the key-board representations. 25 represents a pause, indicating prolongation of the note *ad libitum*, and other signs and directions, as for instance Da capo, shown at 26, and repeat-signs, shown at 27, and other signs may be employed, either upon the representations of the keys or above or below the key-board representations, as may be most convenient or desirable. Various words relating to pace, intensity, and style may be employed, preferably above the representations of the key-board, as shown by the words Largo, at 28, Allegro, at 29, by the letters *f*, *ff* and *fff*, shown at 30, 31 and 32, and the letters *p*, *pp*, *ppp*, shown respectively at 33, 34 and 35, or the words Brillante, Con moto, shown respectively at 36, 37, or other indicia, may be employed as the exigencies of the case may require.

The representations of the fingering board may be upon sheets 41, of paper or the like, which may be either loose as shown at 42, or in book-form, as shown at 43, or may be in the form of a web, as shown at 44, the sheets, whether in the form of leaves or web, having thereon pluralities of representations of the fingering board or key-board in successive and preferably in superposed relation. Thus in Fig. 2 I have depicted keys which will be struck at successive time-intervals in the playing of the first two measures of the selection " America," notes being represented in connection with the keys, upon succeeding representations 45, 46, 47, 48, 49, 50 of the key-board of the instrument.

In Fig. 3 I have similarly shown the representations of the key-board with depictions of the notes on the keys struck by the fingers upon the key-board of the instrument, at the successive time-intervals in the third and fourth measures from the last in the same selection, the representations of the key-board in this instance being shown at 51, 52, 53, 54, 55 and 56. In this latter example, in representation 52, the notes F in the first octave of the bass notes and D in the first octave of the treble notes are struck simultaneously by the fingers of the left hand, the said note F being a quarter note and the said note D being an eighth note, the striking of which latter is followed in eighth time by the striking, by a finger of the left hand, of the lower note C in the first octave of the treble keys, being also an eighth note, the two eighth notes occupying the duration interval of the quarter note F mentioned. The said notes F and D are therefore struck as a chord, to indicate which they may be connected by a chord-sign 58, which extends laterally for connecting the representations of notes in lateral arrangement. To indicate that they are the first notes struck, they may be accompanied by the indication "1", as shown at 59, the note C being accompanied by the indication "2", as shown at 60, to show the sequence of the playing of the notes. A similar chord-sign is employed between notes of the same time-interval struck simultaneously by the finger of the right hand, namely the notes F and B flat, in the first octave of the treble keys, followed by the striking of the note A in the same octave, the notes B flat and A being eight notes, together of the duration of the quarter note F.

In Figs. 2 and 3, the entire key-board of the piano is depicted. In a great many selections, however, the range of pitch is encompassed in but a portion of the key-board, for instance, in three octaves embracing the first two octaves of the bass keys and the first octave of the treble keys. When representing selections of this character or of other characters embracing less than the entire key-board, I prefer to abbreviate the representations of the key-board, showing the range only of the key-board employed in playing the selection. Thus in Fig. 4, 61, 62, 63, 64, 65 and 66 represent depictions of the key-board abbreviated in the manner stated, and the notes shown represent the third and fourth measures of the selection " America ", the respective representations of the key-board indicating the successive time-intervals in said two measures.

In order to indicate the treble keys and the bass keys respectively, so that the performer may know in which register of the instrument the notes represented are to be played, I depict the treble and bass keys or finger-positions respectively by distinguishing representations. This may be done by successively numbering the octaves on the treble-key representations by the letter T with the exponent successively of 1, 2, 3 and 4, or such of the same as may be employed, to denote the treble-register, as shown at 67, and the bass-key representations by the letter B with the exponents 1, 2, etc., dependent on the number of octaves of the bass keys employed in the selection, to denote the bass-register, as shown at 68. A further distinguishing character employed may be a vertical line drawn between the final letter B of the bass keys and the initial key C of the treble keys, as shown by the line 69. I also indicate the depictions of the notes respectively played with the left and right hands, in distinguishing manner, as by providing the notes to be played by the left hand with depending stems as shown at 70 and the notes to be played by the right hand with upwardly extending stems as shown at 71.

If desired, the fingering board representations may be depicted on a web of flexible material shown at 44 arranged to be rolled upon rolls 77 78, and suitable mechanism may be employed for controlling the rolling or the unrolling of the web, for instance by an electric motor 79, the speed of which is controlled by a rheostat 80 for controlling the speed of movement of the web, and its direction of rotation by a reversing switch 81, for controlling the direction of movement of the web. 82 is a double pulley loose on the unrolling shaft 83 and 84 a pulley loose on the rolling shaft 85 connected by a belt 86, a belt 87 connecting the pulley 82 with the motor-pulley 88. A clutch 89 between the pulley 82 and shaft 83, and a clutch 90 between the pulley 84 and shaft 85, are alternately brought into operative connection by a shifter 91 for connecting the respective pulleys with their shafts. This web may be of light-transmitting material, preferably translucent, as a paper suitably treated, and if desired means may be provided for lighting the reverse side of the unrolled portion of the web, for instance by an electric lamp 92 suitably disposed for lighting the unrolled portion of the said web so that the representations of the fingering board with the notes and indicia thereon may be passed before the view of the performer against the lighted background.

Having thus fully described my invention, what I claim as new and desire to secure by Letters Patent is:

1. A flexible sheet or sheets having a plurality of depictions of the fingering-board of a musical instrument thereon, and notes of a musical composition divided into successive groups of notes respectively located in direct connection with said respective depictions of said fingering-board, the said depictions of said fingering-board with the said groups of notes respectively in direct connection therewith being in separated relations and in the sequential arrangement of said musical composition, and the said depictions of said fingering-board comprising depictions of the treble keys and bass keys having a distinguishing mark between them.

2. A flexible sheet or sheets having a plurality of depictions of the fingering-board of a musical instrument thereon, and notes of a musical composition divided into successive groups of notes respectively located in direct connection with said respective depictions of said fingering-board, the said depictions of said fingering-board with the said groups of notes respectively in direct connection therewith being in separated relations and in the sequential arrangement of said musical composition, the said depictions of said fingering-board comprising depictions of the treble keys and bass keys having a distinguishing mark between them and arranged in octaves oppositely and consecutively numbered.

In testimony whereof, I have signed my name hereto in the presence of two subscribing witnesses.

DAVID J. DICKSON.

Witnesses:
 THOMAS K. SCHMUCK,
 JOSEPHINE A. HAMELRATH.